(12) United States Patent
Nakamura

(10) Patent No.: US 6,571,170 B2
(45) Date of Patent: *May 27, 2003

(54) INFORMATION PROVISION SYSTEM, CURRENT-POSITION-MEASUREMENT SYSTEM, AND METHOD THEREFOR

(75) Inventor: Akiyoshi Nakamura, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/080,463

(22) Filed: Feb. 22, 2002

(65) Prior Publication Data

US 2002/0077744 A1 Jun. 20, 2002

Related U.S. Application Data

(62) Division of application No. 09/675,448, filed on Sep. 28, 2000.

(30) Foreign Application Priority Data

Oct. 7, 1999 (JP) .......................................... 11-287275

(51) Int. Cl.[7] .............................................. G01C 21/28
(52) U.S. Cl. ...................... 701/202; 701/201; 701/207; 701/208; 705/5
(58) Field of Search .............................. 701/201, 202, 701/208, 213, 214; 705/5, 6

(56) References Cited

U.S. PATENT DOCUMENTS 5,940,803 A * 8/1999 Kanemitsu ...................... 705/6
6,119,095 A * 9/2000 Morita ........................... 705/5
6,141,609 A * 10/2000 Herdeg et al. ................. 701/35

FOREIGN PATENT DOCUMENTS

| JP | 9-102094 | 10/1995 |
| JP | 9-319300 | 5/1996 |
| JP | 10-105051 | 9/1996 |
| JP | 10-185599 | 12/1996 |
| JP | 11-143358 | 11/1997 |
| JP | 11-150759 | 11/1997 |

* cited by examiner

Primary Examiner—Gertrude Arthur
(74) Attorney, Agent, or Firm—Harness, Dickey & Pierce, P.L.C.

(57) ABSTRACT

An information provision system 11 is provided which provides in advance a travel data package 10 via the Internet 1, in which data effective for measuring the current position such as the longitude and latitude information of a travel site location is stored based on itinerary information in such a manner as to be associated with an itinerary. Then, as a result of going on a travel by storing the distributed travel data package 10 in a portable terminal 6, it is possible to measure the current position in a short time because the longitude and latitude information, for example, of a scheduled place of the itinerary can be known in advance at a travel site.

14 Claims, 10 Drawing Sheets

[FIG. 1]
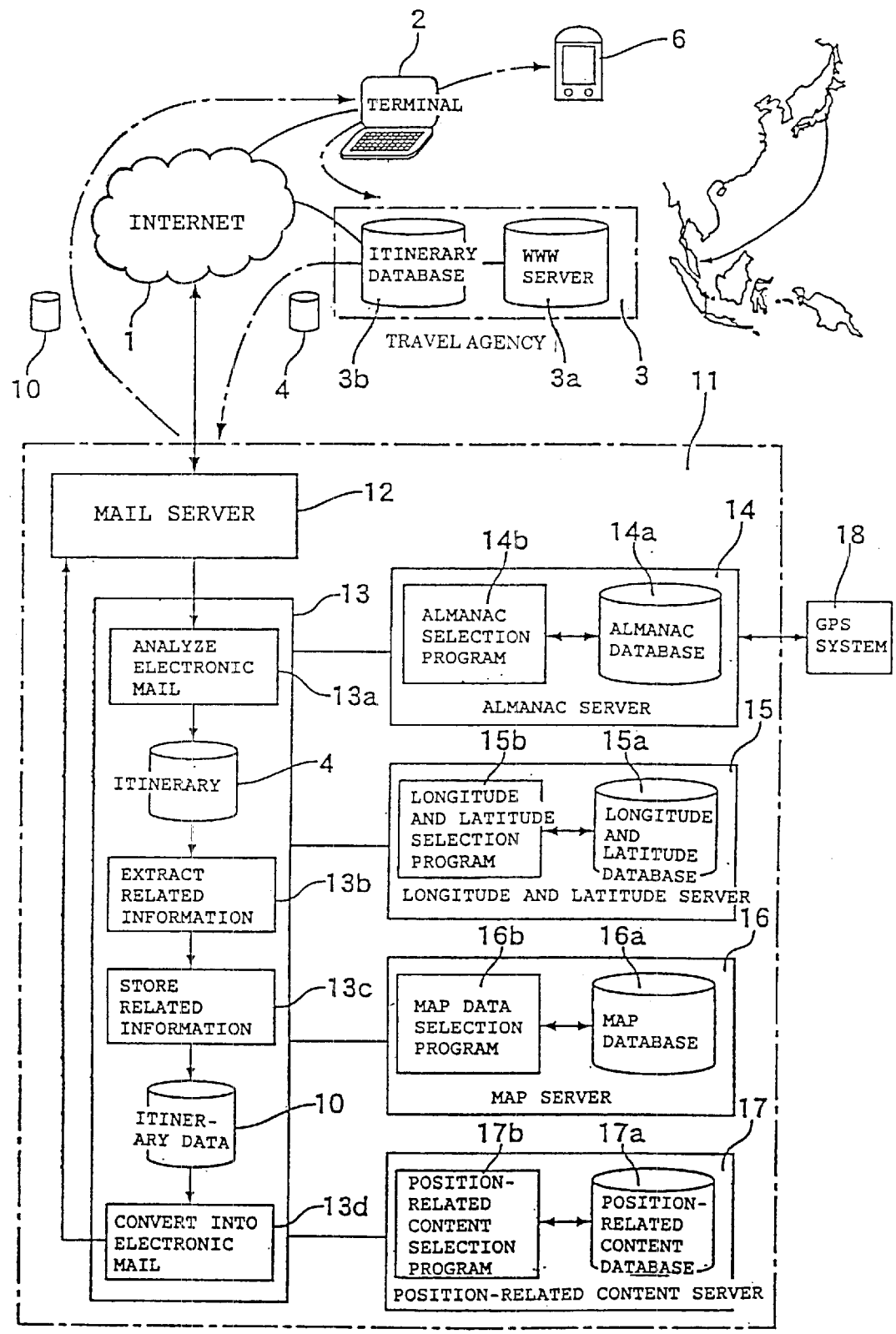

[FIG. 2]
(a)
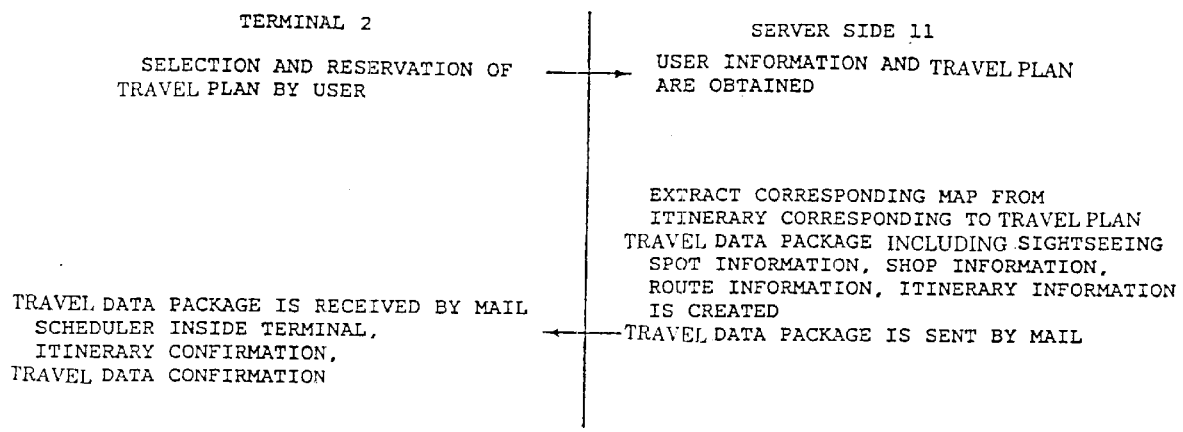
(b)
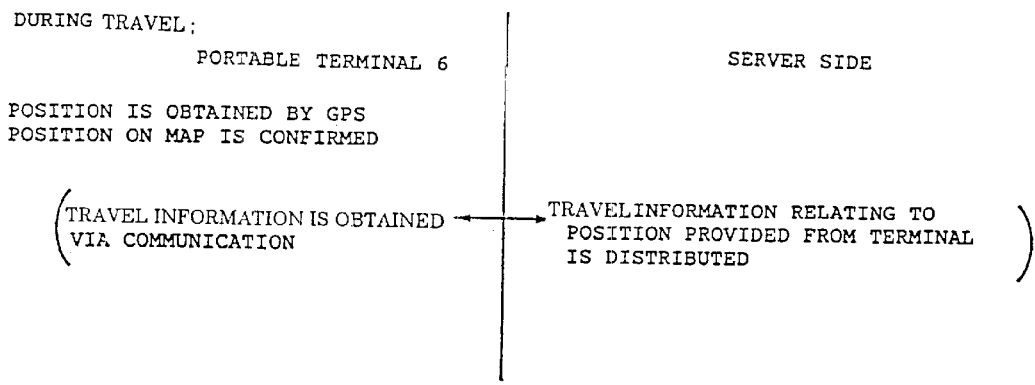

[FIG. 3]
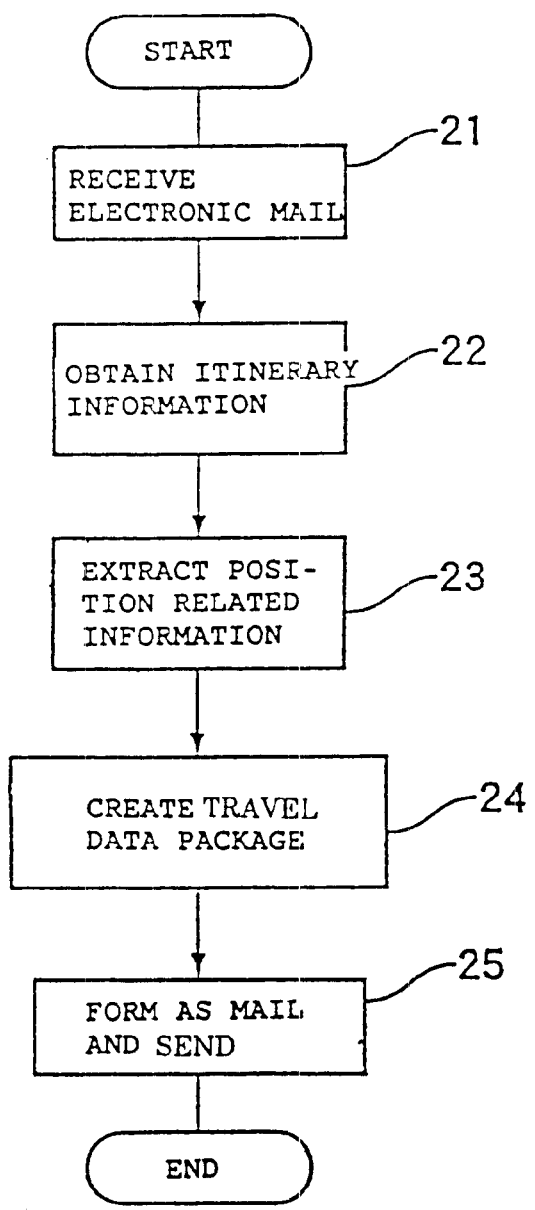

[FIG. 4]
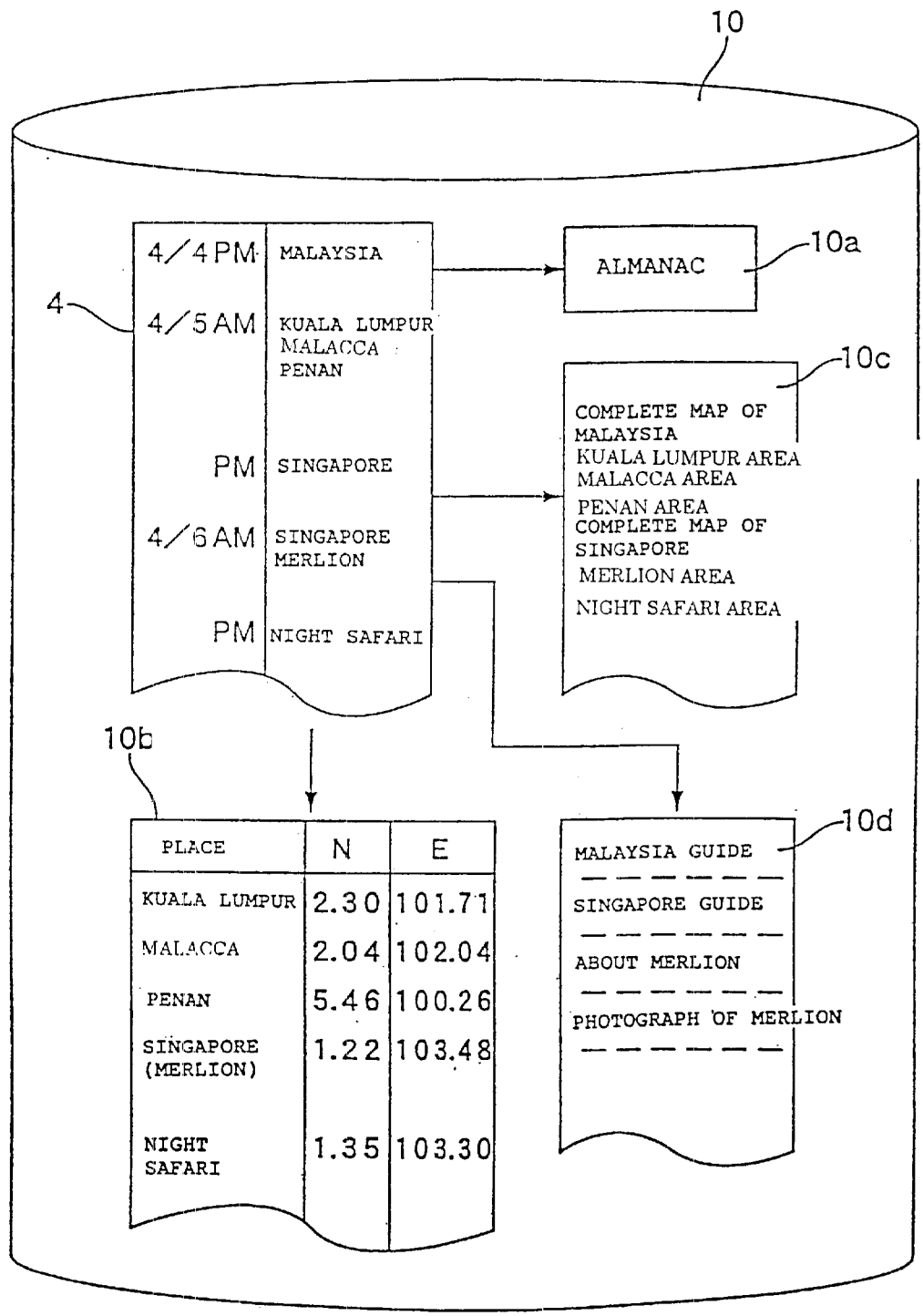

[FIG. 5]
(a) 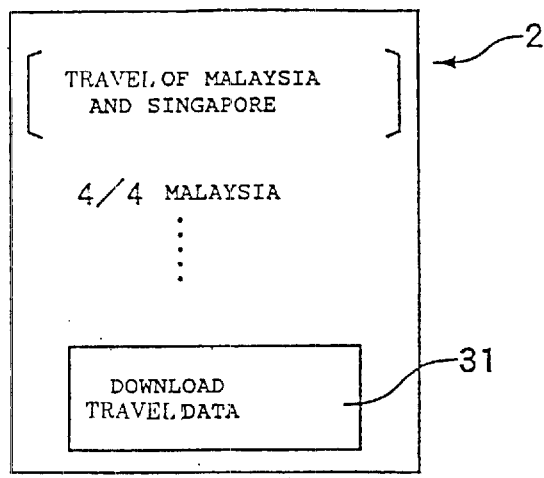
(b) 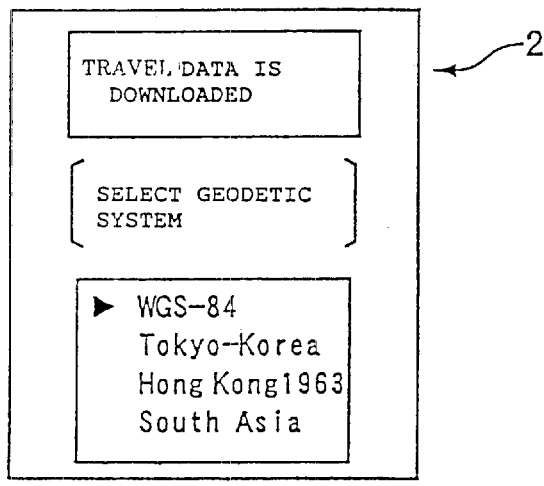
(c) 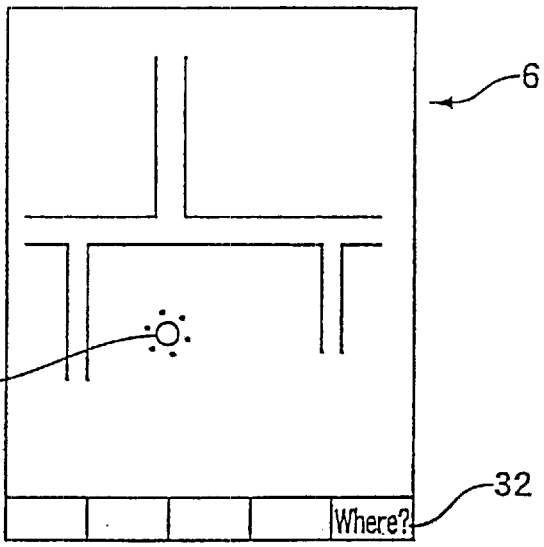

[FIG. 6]
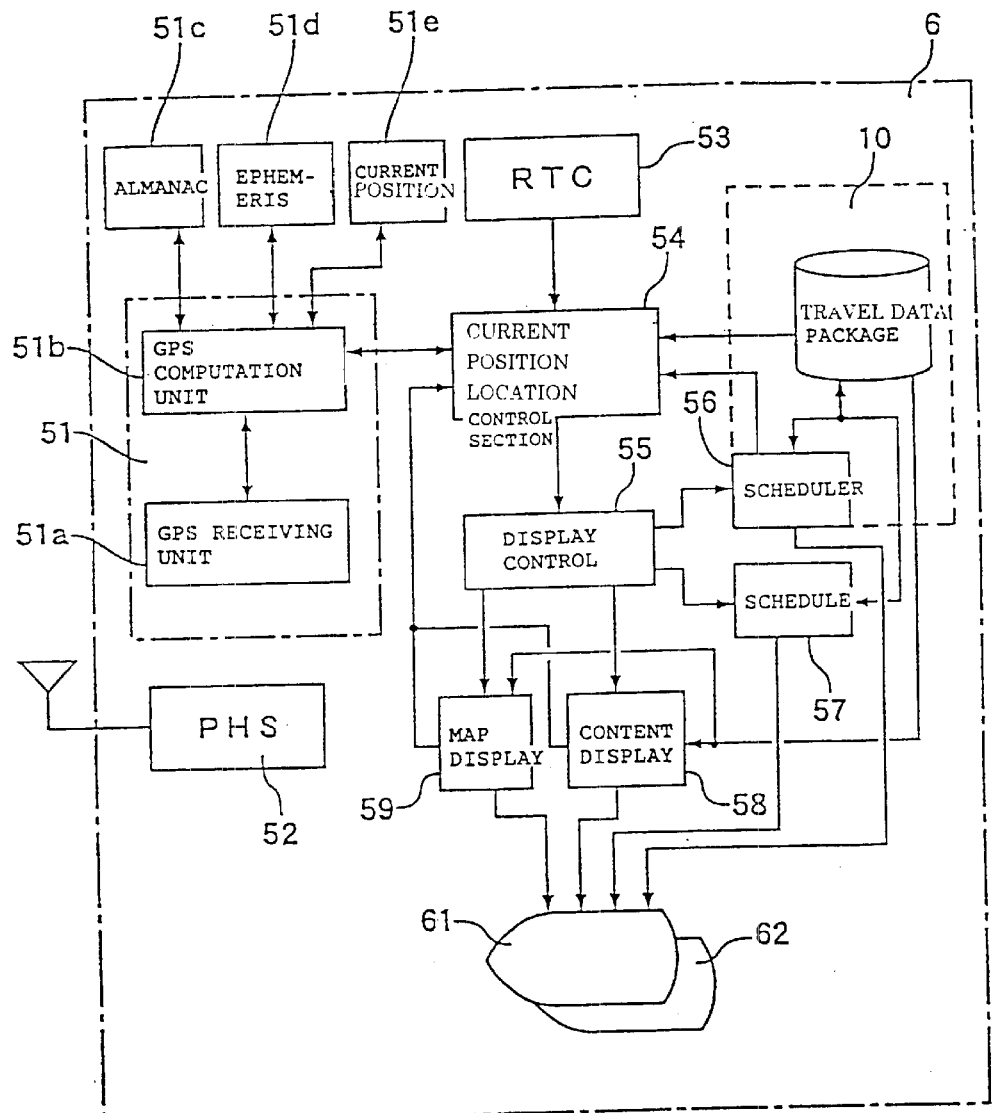

[FIG. 7]
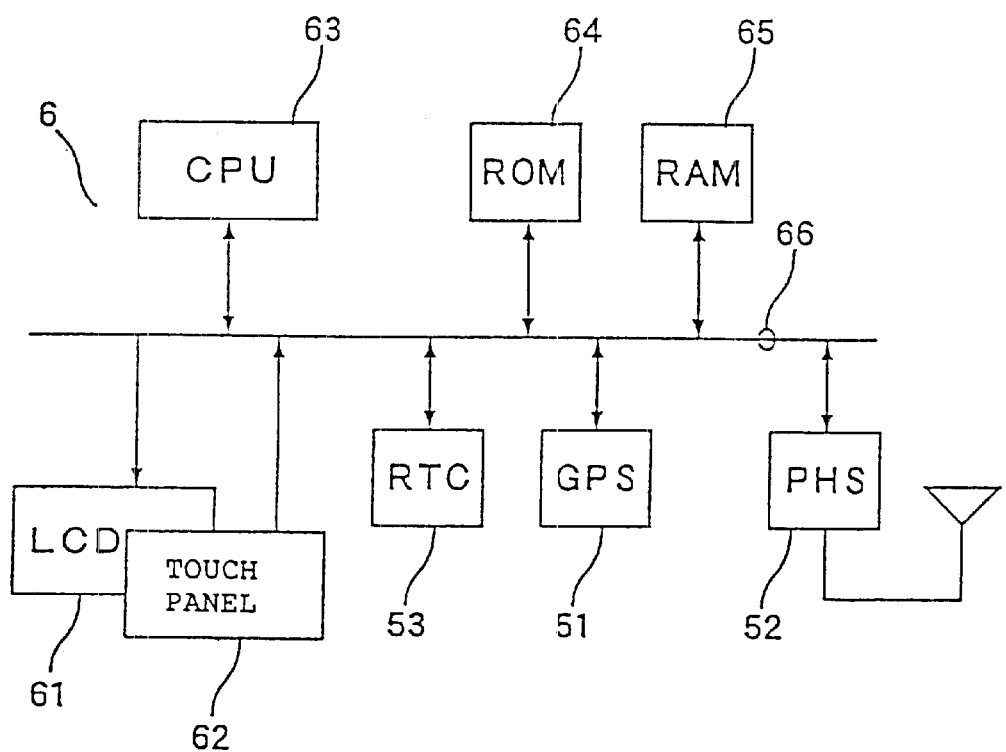

[FIG. 8]
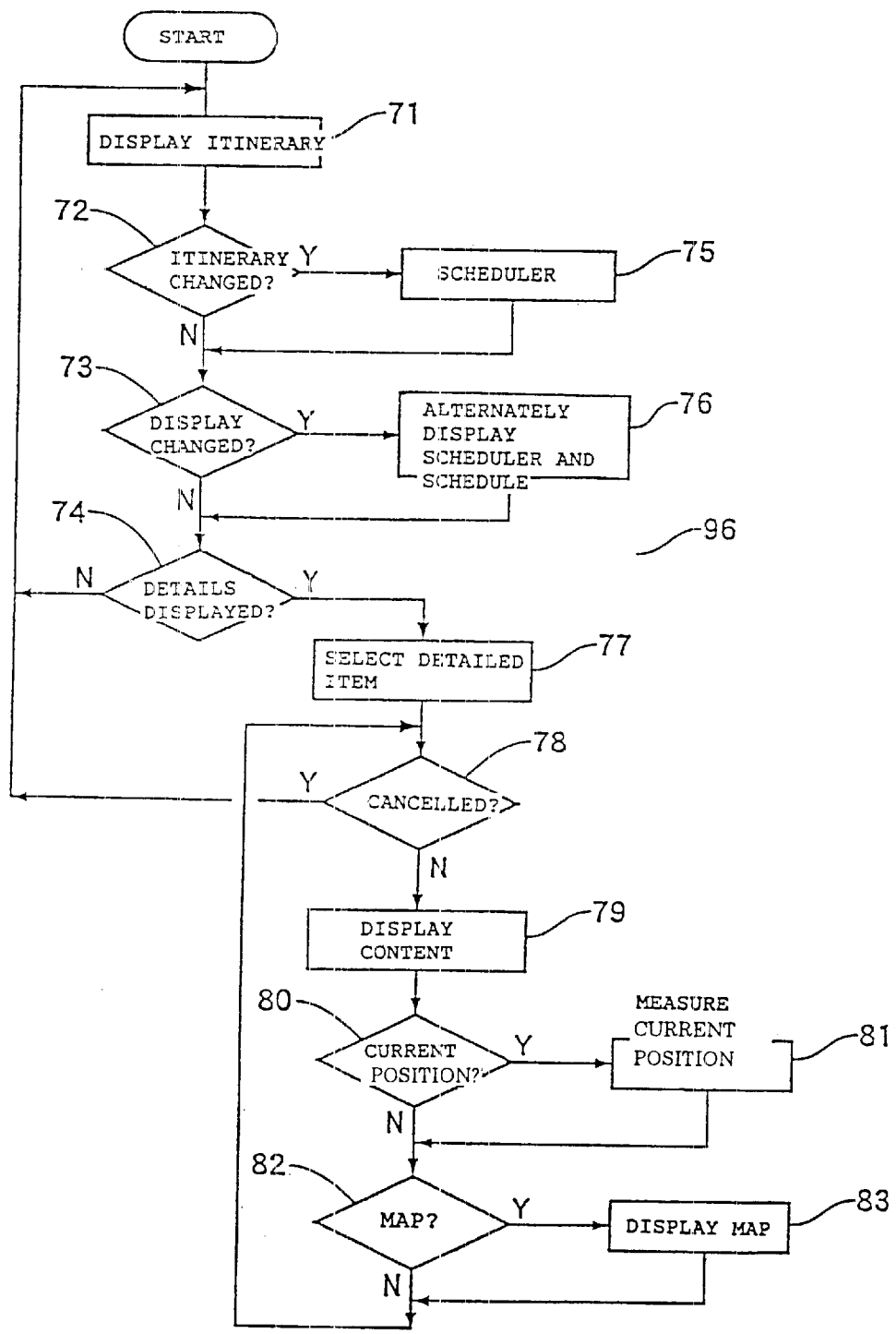

[FIG. 9]
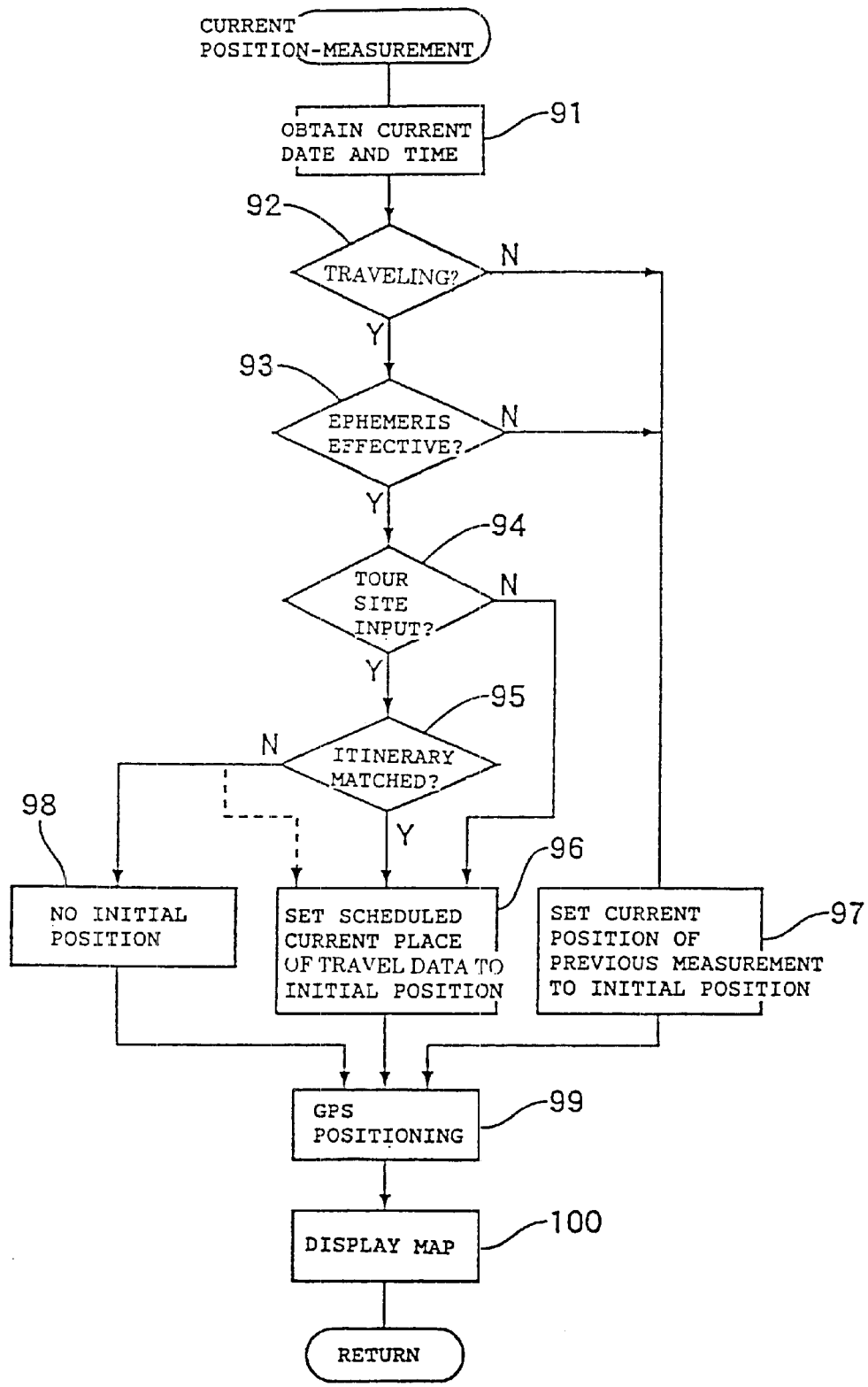

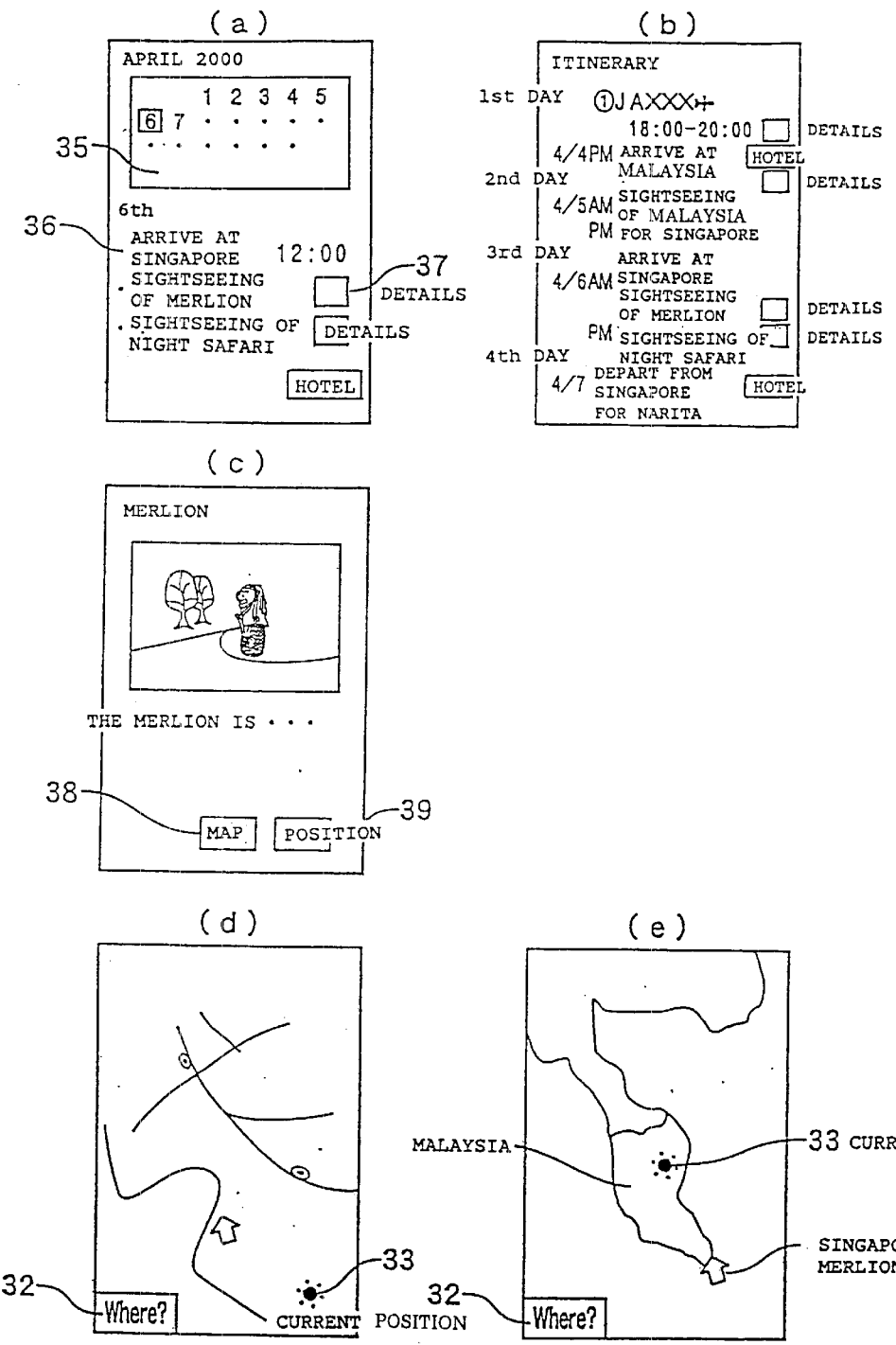
[FIG. 10]

INFORMATION PROVISION SYSTEM, CURRENT-POSITION-MEASUREMENT SYSTEM, AND METHOD THEREFOR

This application is a divisional of application Ser. No. 09/675,448 filed on Sep. 28, 2000.

BACKGROUND OF THE INVENTION

1. Technical Field of the Invention

The present invention relates to an information provision system capable of providing convenience to travelers.

2. Description of the Related Art

Recently, with the widespread use of the Internet, various distribution businesses are being incorporated with the Internet. Similarly, in the travel agency business, various services, such as searching and reservation of package travels, provision of travel information, and personal bulletin boards, are provided on the Web. In the future, it is considered that the trend will become increasingly stronger, but at present, the incorporation is confined to substitutions of actual travel agency businesses. Regarding uses of the Internet, promptness, taste of users, and services meeting needs are possible, and there is a possibility that the services of current travel agency businesses can be greatly expanded.

On the other hand, regarding GPS navigation systems, as an apparatus relating to a global positioning system (GPS) apparatus having high-speed performance, in particular, for determining a time to a first position and for recapturing, Japanese Unexamined Patent Application Publication No. 7-191127 is known. In order to measure the current position by GPS, time, orbit information (Ephemeris) of each satellite, information (Almanac) of a group of satellites, and correction data of the ionosphere are required as initial information. In order to determine the current position in a short time, it is more preferable that approximate positional information be available. Conventionally, under the precondition that approximate positional information and the almanac cannot be known in advance, improvements in technology for achieving higher speed are being made, and Japanese Unexamined Patent Application Publication No. 7-191127 is an example thereof.

Thus, Japanese Unexamined Patent Application Publication No. 7-191127 relates to a method for searching and capturing a signal from a GPS satellite by a multi-channel GPS receiver and to a multi-channel GPS receiver. A method is described therein in which the time until the initial position determination of a GPS receiver is improved by calculating in advance GPS satellites which are expected to appear at a plurality of times in the future on the basis of the current time, a GPS almanac, and a predetermined geographical position, and by searching for a GPS satellite when power is switched on again.

Accordingly, it is an object of the present invention to provide a travel data package which makes it possible to enjoy more a travel by being installed in a portable terminal and a system, and an information provision system for supplying it. Furthermore, it is an object of the present invention to provide a client/server system capable of providing a wide range of services in combination with a travel agency business on the Web which can be accessed via the Internet and by adding new best functions thereto.

In addition, this invention also aims to provide a system which is, by using this travel data package, capable of shortening the time for measuring the current position even when a large distance is traveled, such as on a travel.

SUMMARY OF THE INVENTION

Accordingly, in the information provision system of the present invention, by providing a data package in which information relating to a travel site location is extracted in advance and stored on the basis of an itinerary, it is only necessary to carry a compact portable terminal to easily see information relating to the location of each travel site, for example, contents introducing that place, a map, photographs, etc. Then, by estimating and creating approximate positional information and an almanac, which are difficult to create each time on the portable terminal side, in the position-related information on the basis of an itinerary, it is possible to provide a system which can shorten the time for obtaining a position even when a large distance is traveled, such as, on a travel.

More specifically, the information provision system of the present invention comprises means for obtaining itinerary information in which at least one place and a date and time are associated; means for extracting position-related information which is related to the place contained in the itinerary information; means for creating a travel data package by associating the extracted position-related information with the date and time contained in the itinerary information; and means for distributing the travel data package. Also, the information provision method of the present invention comprises a step of obtaining itinerary information in which at least one place and a date and time are associated; a step of extracting position-related information related to the place contained in the itinerary information and of creating a travel data package in which the position-related information is associated with the date and time contained in the itinerary information; and a step of distributing the travel data package.

In the information provision system and the information provision method of the present invention, an operation is performed for extracting position-related information, for which processing performance is required, on a server side having added functionality and a high-speed operation in which an information provision system is installed, the position-related information is formed as a data package in advance, and travel data is distributed. Therefore, a user receiving this travel data package can easily obtain information relating to a travel site at each travel site by merely storing a travel data package in a portable small-capacity terminal. It is possible to carry a data package containing all information relating to the travel sites, for example, the country to be visited, and to obtain information by retrieving it for each place visited. However, since the amount of data is too large, it is not easy to store all of it in a portable terminal. On the other hand, although it is also possible to obtain information on a place visited on demand via the Internet, a connection time with a network is required. Also, depending on the travel site, there is a possibility that an infrastructure for connecting to the Internet is not available, or the information obtained is only in a language which cannot be understood.

In contrast, in the information provision system and the information provision method of the present invention, since position-related information is extracted on the basis of an itinerary, it is possible to considerably reduce the travel data to be formed as a package. Therefore, the travel data can also be easily stored in a portable terminal. Also, since position-related information is extracted on the basis of an itinerary, most of the information requested at a travel site can be covered. Also, since position-related information is formed as a package in advance, it is possible to quickly see information relating to a travel site. Also, since a travel data package can be created for each user, it is possible to collect information on which language can be easily understood by the user. In addition, since the taste of the user can be reflected, it is possible to form in advance information as a package which will be required by the user, which is easier to use.

Furthermore, it is possible to put, into position-related information, at least some auxiliary position-measurement information used when the current position is measured, at least one piece of longitude and latitude information corresponding to a place in the itinerary information, or map data containing places. The auxiliary position-measurement information is, for example, an almanac used when radio waves from a satellite are received to measure the position of a current position. The almanac is effective for about one to three months, and information relating to the date and time and an area, which are required at a travel site, can be anticipated in advance and can be put in a travel data package. Then, at the travel site, it is possible to save the work of downloading an almanac for measurement of position, and it is possible to search for a satellite for measurement of position in a short time. Therefore, it is possible to obtain the current position in a short time even at a travel site.

In addition, if longitude and latitude information is contained in the position-related information, the current position can be measured by using the longitude and latitude information of the travel site as an initial position, also making it possible to measure the current position in a short time. Normally, initial position data required to speed up the capturing of GPS is from about 150 km up to about 1500 km no matter how far the distance is away. In a trip abroad, in most cases, since this degree of distance is traveled, it takes more time to capture GPS than in a case in which an initial position is not given unless an appropriate initial position is given. For example, if a user in Japan goes on a trip abroad, in a conventional GPS terminal, an attempt is made to capture a satellite by using the location of Japan as the initial value. In this case, it takes more time to determine that a satellite is not found.

In a case where longitude and latitude information is stored inside a terminal in such a manner as to correspond to each place in the whole world, wasteful data is always stored for a travel site which is seldom visited in a lifetime. The case in which data for the whole world is stored causes an increase in the memory capacity for storage and affects the cost, and in turn, the size, and this is similar to other position-related information. Therefore, adoption of a travel data package of the present invention leads to a reduced cost/reduced size of a terminal, an improvement in the capturing speed of GPS, and in turn, an improvement in the user interface.

It is also possible to include map data, such as the surroundings of a travel site location, including the place thereof, as position-related information, and a map can be displayed on a portable terminal at a travel site. Also in this case, having map information corresponding to each place in the whole world is impossible in practice and is quite wasteful. However, by extracting necessary map information by an itinerary, it is possible to store the necessary map information in a portable terminal without significantly increasing the amount of data.

Also, with respect to an information provision system, an information provision system can be obtained by sending an itinerary via a computer network, such as the Internet. Also, by forming a travel data package into a transmission medium as an electronic mail or as a data package, in which the travel data package is embedded, it is possible for the user to obtain it via the computer network. Therefore, the information provision system of the present invention can be provided as part of a client/server system, having increased general-purpose characteristics, which is capable of providing a wide range of services by making it possible to access it via a computer network.

When position measurement is performed by using the information of this travel data package, by obtaining the date and time (the current date and time) at which position measurement is performed from a real time clock and by using the coordinates of the travel site when the current date and time matches the travel date and time, it is possible to confirm with accuracy the current position in a short time, for example, even in a foreign country outside Japan.

Accordingly, in the present invention, there is provided a current-position-measurement system comprising means for obtaining auxiliary position-measurement information or longitude and latitude information, corresponding to the current date and time obtained from a real time clock which counts the date and time, from a travel data package in which position-related information having at least some auxiliary position-measurement information used when the current position is measured or at least one piece of longitude and latitude information corresponding to a travel site location is stored in such a manner as to be associated with the travel date and time. Also, a portable terminal having this current-position-measurement system, a GPS system which can receive radio waves from a satellite and convert them into information of the current location, and a memory storing a travel data package has a function capable of easily obtaining the current location in a short time at a travel site. Furthermore, in the present invention, there is provided a current-position geodetic method comprising an initial step of obtaining auxiliary position-measurement information or longitude and latitude information, corresponding to the current date and time obtained from a real time clock which counts the date and time, from a travel data package in which position-related information having at least some auxiliary position-measurement information used when the current position is measured or at least one piece of longitude and latitude information corresponding to a travel site location is stored in such a manner as to be associated with the travel date and time, and a step of measuring the current position by using the auxiliary position-measurement information or the longitude and latitude information obtained in the initial step.

In comparison with an almanac for a GPS satellite, the ephemeris is effective only for about four hours, and it is downloaded from a satellite. Therefore, when there is an effective ephemeris, since it can be determined that position measurement was performed at a position sufficiently close to the current location, it is desirable that the position of the current location be measured by using the information at that time, that is, the up-to-date longitude and latitude information which was measured in the past, as the initial position.

Also, a means or step of inputting a travel site location may be provided, so that, when the place (the input place or the current-location area specification) of the input travel site matches a location (scheduled location) of a travel site corresponding to the current date and time in a travel data package, longitude and latitude information associated with the current date and time can be obtained from the travel data package so as to be used as the initial position. Since the travel progresses according to the itinerary when the current-location area specification matches the scheduled place, it is possible to obtain the current position with high accuracy in a short time by measuring the current position by using the longitude and latitude information of the scheduled place as the initial position.

Also, when the input place or the current-location area specification does not match the scheduled place, since information of a travel site different from the current location is referred to, it is preferable that the current position be measured by using the longitude and latitude information of the scheduled place on the itinerary as the initial position. Alternatively, by determining that the travel is not progressing according to the itinerary, and by measuring the current position without setting the initial position, spending time as a result of measuring the position of the current location on the basis of an erroneous initial position can be prevented.

Furthermore, by taking into consideration a case in which the itinerary is changed, it is preferable that a scheduler function be provided which is capable of displaying and editing the travel date and time of a travel data package and position-related information associated with the travel date and time. Also, it is possible to use this scheduler function as a means for inputting a travel site.

Furthermore, if the position-related information is made to contain map information corresponding to a travel site location, it is possible to display the current position which is measured on a map in a manner which is easy to understand.

The information provision system and the current-location position-measurement system of the present invention can be realized by installing an information provision program and a current-location geodetic program having commands capable of executing the above-described information provision method and the above-described current-location geodetic method in a server and a portable terminal, respectively. Also, these programs can be provided in such a way that they are recorded on a computer-readable recording medium, and furthermore, can be provided in such a way that they are converted into or embedded into a communication medium or a transmission medium, which is supplied via a computer network or other communication means.

The above-described travel data package can also be provided in such a way that it is recorded on a computer-readable recording medium, and furthermore, can be provided in such a way that it is converted into or embedded into a transmission medium or a communication medium, which is supplied via a computer network or other communication means.

BRIEF DESCRIPTION OF THE DRAWINGS

FIG. 1 is a diagram showing the outline of an information provision system according to an embodiment of the present invention.

FIGS. 2a and 2b are flowcharts illustrating the outline of the present invention.

FIG. 3 is a flowchart showing the outline operation of the information provision system.

FIG. 4 is a diagram showing an example of a travel data package.

FIGS. 5(a)–5(c) include diagrams showing a state in which a travel data package is downloaded from the information provision system.

FIG. 6 is a block diagram showing the functional construction of a portable terminal which uses the downloaded travel data package.

FIG. 7 is a diagram showing the outline of the hardware construction of the portable terminal.

FIG. 8 is a flowchart showing the outline of an operation for using the travel data package in the portable terminal.

FIG. 9 is a flowchart showing a process when the current position is measured by the portable terminal during a travel.

FIGS. 10(a)–10(e) are diagrams showing an example of a display in a case where the travel data package is used in the portable terminal.

DESCRIPTION OF THE PREFERRED EMBODIMENTS

An embodiment of the present invention will be described below with reference to the drawings. In FIG. 1, the outline of a system or services is shown in which the provision of the above-described travel data package 10 from an information provision system 11 via the Internet 1 is received by a terminal 2, such as a desk-top type, the travel data package 10 is installed in a portable terminal 6, and the user goes on a trip. These services can be broadly classified into two phases or processes. The first phase is a phase in which an itinerary 4 is organized on a homepage 3 of a travel agent, which is available on the Internet 1, the travel data package 10 is created, based on the itinerary 4, by the information provision system (hereinafter, "server") 11, and the provision thereof is received. The second phase is a process in which the provided travel data package 10 is stored in the portable terminal 6, and the current location of the travel site is measured.

FIG. 2(a) shows the outline of the first phase. Initially, in the terminal 2, access to a server system 3a of a travel agency is made so that selection and reservation of a travel plan by a user are performed. The itinerary (itinerary information) 4, corresponding to the travel plan, in which the travel site (place) and the date and time are associated with each other, is sent from an itinerary database 3b to the information provision server 11 by electronic mail. Then, in the information provision server 11, the travel data package 10 in which various pieces of information corresponding to the itinerary are collected is created and is sent to the terminal 2 of the user by electronic mail. The information provision server 11 may of course be in the server system of the travel agent (travel agency). It is also possible for the travel agency to provide the travel data package 10 as part of services to a user. Furthermore, a service such that an itinerary is sent to the information provision system 11 by the user on his/her own so as to create the travel data package 10 is also possible. Also, instead of transmitting and receiving the itinerary 4 and the travel data package 10 by electronic mail, such a system or service as that which creates the travel data package 10 at the same time an itinerary is organized on a homepage is included in the present invention. Hereinafter, the present invention will be described by using an example in which these pieces of information are exchanged by electronic mail.

The second phase is shown in FIG. 2(b), in which the position can be obtained by a GPS at a travel site by means of the portable terminal 6 storing the travel data package 10, and the position can be displayed on a map. Since information necessary for this is stored in the travel data package 10, processing can be performed even if communication with the server side is not performed. Of course, if there is an environment in which a communication means, such as a PHS, is provided, and communication can be performed at a travel site, it is possible to access an appropriate server and to obtain itinerary information.

Referring back to FIG. 1, a more detailed description of the information provision system (server) 11 for creating and supplying the travel data package 10 is given. The information provision system 11 comprises a mail server 12 having the function of transmitting and receiving electronic mail, and a creation section 13 for creating a travel data package. Furthermore, as data servers to which this travel data package creation section 13 can make access, an almanac server 14, a longitude and latitude information server 15, a map server 16, a position-related content server 17, etc., are provided, so that it is possible for the creation section 13 to create auxiliary position obtaining information data, such as an almanac, create longitude and latitude information, select map data, and select sightseeing data from the itinerary data 4. For this purpose, the respective data servers 14, 15, 16, and 17 comprise databases 14a, 15a, 16a, and 17a, and selection programs 14b, 15b, 16b, and 17b, respectively, for selecting information from each database.

The travel data creation section 13 comprises a function 13a for analyzing the received electronic mail and extracting the itinerary data 4, a function 13b for extracting position-related information in accordance with the itinerary from each of the data servers 14, 15, 16, and 17 on the basis of this itinerary data, a function 13c for storing these pieces of extracted information in such a manner as to be associated with an itinerary so as to create the travel data package 10, and a function 13d for forming the created travel data package 10 as an electronic mail message and sending it to the user.

In the information provision system 11 of this example, a connection from the terminal 2 is made via a dial-up server of a group of servers, including this information provision server or system. In the case of mail, a connection with a mail server is made, and in the case of a Web browser, a connection with a WWW server is made, so that a connection with the information provision server is established, and processing comparable to processing to be described below can be performed. The data of the WWW server is displayed by specifying a homepage address via a browser (application software for displaying data on the Web) on the terminal 2. Since the connection with the server is publicly known, a detailed description is not given here.

Referring to the operation flowchart shown in FIG. 3, the functions of the information provision system 11 of this example are described further.

Initially, the user accesses the homepage of the travel agency via the browser in order to select and reserve a travel. A corresponding itinerary from the itinerary database of the travel agency is distributed from a data distribution server 3b by electronic mail, and the information provision system 11 receives this itinerary in step 21. Then, in step 22, the electronic mail is analyzed to obtain the itinerary 4. The itinerary data 4 is such as that shown in FIG. 4, in which the date and time and the travel sites (including information indicating places to be visited and places to stay) at that time are associated with each other. Such itinerary data can also be distributed from the server to the user in a travel agency on the Web, and the itinerary data can also be sent from the user to the information provision system 11.

FIG. 4 shows an example of the structure of the travel data package 10 created by the information provision system 11. In this travel data package 10, the itinerary data 4, and as position-related information which is associated in such a manner as to be capable of referring to on the basis of this the itinerary data 4, almanac data 10a, longitude and latitude information 10b of each place, map information 10c of each place, and position-related contents 10d, including guides, photographs, etc., of each place, are formed as a file and packaged in a state in which each can be referred to. Of course, the structure of the data package 10 is not limited to that shown in FIG. 4, and a structure in which all data is stored in one file is also possible.

Next, in step 23, each position-related information is extracted from the itinerary data 4. In this example, one piece of the position-related information is auxiliary position information obtaining data, and here, the information is created from the itinerary data 4 in which the almanac data is received. In the information provision system 11 of this example, an almanac of a GPS is obtained from a GPS system 18 connected to the server 11 and is stored in the almanac database 14a. This GPS system 18 is a system for receiving a GPS signal from a fixed station of the GPS and transmitting it as data. In the almanac database 14a, all the almanacs contained in the GPS signal are stored. Since it takes about 12 minutes to store all the almanacs and the almanac itself is updated periodically, the almanac is stored periodically in the almanac database 14a.

This almanac, which contains orbit information of all the GPS satellites, is information necessary to select a GPS satellite which can be received at a place and at a time at which position measurement is to be performed. Therefore, the almanac is indispensable information in order to perform GPS position measurement, and it must be downloaded before position measurement is performed. The almanac is effective for about 30 days to about three months, and by referring to the itinerary data, an almanac effective at the date and time during a travel can be added to the travel data package 10. For example, if the travel date is within 30 days of the date and time of the almanac which is obtained currently, the current almanac is selected. If the travel date is after that, an almanac of the corresponding travel date is predicted and calculated from the current almanac, and can be added to the travel data package 10. Of course, "30 days" is an example, and 20 days or another period is also possible.

The prediction and calculation may be approximate rather than accurate. The almanac shifts little by little and has the latest data for each satellite. Since the position of a satellite sometimes changes abruptly, a complete prediction cannot be made. However, the position of every satellite does not change abruptly, and the almanac can normally be used for approximately three months in which a time lag, for instance, exceeds a permissible range. Therefore, since the previous almanacs are selected and stored for each satellite in the almanac database, approximate prediction is possible in accordance with the law of the orbit of a satellite from the past orbit for each satellite.

In step 23, the longitude and latitude data of the travel site is extracted, as position-related information, from the itinerary data 4. The longitude and latitude selection program 15b of the longitude and latitude server 15 obtains the longitude and latitude prestored in the longitude and latitude database 15a. As a result, the data of a place and north longitude (N) and east latitude (E), such as the longitude and latitude data 10b shown in FIG. 4, are created.

A map differs depending on a position-measurement system, and if an appropriate position-measurement system and coordinates (longitude and latitude) are not used, the display on the map shifts. The "position-measurement system" is a coordinate system for representing a position, such as on sea and on land, by longitude and latitude. The position-measurement system usually differs from country to country. The coordinate system which is determined from the results by observing a man-made satellite in the whole world is called a "world geodetic system" (WGS-84, etc.), and in a GPS, the world geodetic system (WGS-84) is used. For this reason, in the present invention, by distributing longitude and latitude information in conformance with the WGS-84, which is a representative position-measurement system, and by distributing a map in conformance with the WGS-84, the problem is reduced. If longitude and latitude information in a different position-measurement system, such as Tokyo-mean, were desired, a list of position-measurement systems corresponding to a travel site determined from travel data may be displayed so that the user is requested to make a selection in advance. Information for each user may be described in an electronic mail transmitting an itinerary to the information provision system 11 so that choices are increased.

Also, the longitude and latitude data shown in FIG. 4 is made to represent one coordinate with respect to one place and is extracted, for example, Singapore. However, coordinate data of four corners may also be prepared in such a manner as to correspond to each place as a region in the database 15a, so that the data is stored in the travel data package 10 as the longitude and latitude data 10a.

Furthermore, in step 23, map data 10c is also extracted as position-related information. Since the longitude and latitude information is created earlier, it is possible to extract map information from the longitude and latitude information of each place. Furthermore, since the itinerary 4 is given, it is possible to limit the range in which the map is extracted by referring to another travel site when the map information is extracted. Alternatively, in the case of a sightseeing tour, since a sightseeing spot which is an object is limited to some degree, the map of that place is also acceptable. Also, in the case of a business trip, it is possible to determine that a detailed drawing of downtown is necessary. This information can be provided to the information provision system 11, as information for each user, together with the itinerary 4 by electronic mail, etc. In the manner as described above, a map may be selected from the longitude and latitude information, or a map may be selected from the place data contained in the itinerary.

For example, although differing from the example shown in FIG. 4, it is possible to extract a map of Beijing city and a map of the Great Wall area in such a manner as to correspond to an itinerary of "Afternoon: Beijing (bus) and the Great Wall". For this purpose, it is only necessary that the map database 16a be constructed so that a Beijing city map can be selected in accordance with the words "Beijing" and the Great Wall outskirts map can be selected in accordance with the words "the Great Wall".

Also, map data having a plurality of scales similar to that used in an ordinary navigation apparatus for vehicle movement purposes and for walking purposes may be selected. The map data may be vector or scalar data, and a deformed simple map may also be acceptable.

Furthermore, in step 23, as position-related information, the position-related content 10d, that is, corresponding sightseeing data from the itinerary, is selected. For example, with respect to the itinerary "April 6, Afternoon: Merlion", an explanation of "Merlion" is selected from the position-related content database 17a by the position-related content selection program 17b. In this explanation of "Merlion", positional information (longitude and latitude information) of "Merlion" is attached thereto in advance. The reason for this is that a corresponding map is displayed by causing the sightseeing data to be associated with the positional information in a case where the travel data package 10 is stored in the portable terminal 6 and is browsed on the terminal side. In this manner, the contents of other sightseeing spots are each selected in accordance with the itinerary data 4.

When the data files 10a, 10b, 10c, and 10d constituting the travel data package 10 are created in this manner, in the subsequent step 24, the travel data package 10 is created by associating those files with the itinerary data 4. Furthermore, in step 25, an electronic mail containing the travel data package 10 as an attached file is created, and the electronic mail is transmitted to the terminal 2 of the user via the Internet 1. The travel data package 10 can also be sent to the terminal 2 connected to the network (Internet) by a distribution by downloading on the Web. In this case, it is preferable that the travel data package 10 be distributed in accordance with an open protocol, such as vCalender/iCalender, which is an Internet standard data format, on the network.

The terminal 2 to which the travel data package 10 is provided via the Internet in this manner need not have a GPS. For example, in a case where the distribution of the travel data package 10 is received from the information provision system 11 by a PC 2, such as a desk-top type, as shown in FIG. 5(a), the Web site of the travel agency is selected and displayed on the PC, and then the user selects a "download travel data" button 31 displayed on the screen. Then, as shown in FIG. 5(b), after the position-measurement system is selected, the data is downloaded. As a result, the "travel data" (travel data package) 10 stored in a hard disk drive, etc., of the PC 2 is transferred to a computer-readable recording medium, such as a small compact flash card (hereinafter, "CF").

The compact flash card in which this "travel data" is placed is mounted to the portable terminal 6 with a GPS and is used. When a user goes on a trip carrying this portable terminal 6 and a map is displayed as shown in FIG. 5(c), a "Where?" button 32 appears. By pressing the button, a current position 33 can be displayed on the map.

In the manner as described above, the travel data package 10 of this example is ultimately for a terminal having a position information obtaining means, such as a GPS. However, it is also possible that a travel data package is received once via a PC which does not have a position information obtaining means, after which data is received via a connection by a serial cable, infrared communication, USB, wireless, etc., or via an external storage device, such as a PCMCIA card. Therefore, the terminal need not have a communication function.

On the other hand, it is also possible for a portable terminal having a communication function, such as a PHS function in addition to the GPS function, to directly access the information provision system 11 in order to obtain the travel data package 10, and, for example, to download it.

Next, a description is given of a case in which the travel data package 10 received in this manner is used for a travel site. FIG. 6 schematically shows the construction of the portable terminal 6 in which the travel data package 10 of this example is stored in a memory. This portable terminal 6 comprises a GPS unit 51 which is currently in general use as a radio-wave position-measurement system among the nations of the world. By receiving radio waves from a satellite by a receiving unit 51a and by analyzing the radio waves by a GPS computation unit 51b, the coordinates of the current position, the time, and the altitude can be determined. An almanac 51c, an ephemeris 51d, and the coordinates 51e of the current position, which were measured in the past, are recorded in a memory, etc. If these are effective when the current position is measured the next time, the initial values thereof are used.

Also, as a communication means, a PHS unit 52 is provided. If access to the Internet via a PHS at a travel site is possible, furthermore, information can be collected, and transmission and reception of an electronic mail can be performed.

The terminal 6 of this example comprises therein an RTC (real time clock) 53 for setting the time, so that the time can be set by a user or accurate time setting can be performed using a GPS. Also, this RTC 53, having a calendar function, automatically counts time, date, and year. The values are maintained by a backup power inside the terminal, so that even if the power SW of the terminal 6 is off, clock continues to count.

The GPS operates by an internal time of a GPS time, and in this example, the RTC (real time clock) on the terminal side is converted into this time so that it can be used. If the RTC 53 on the terminal side is set once, it is the same even if the place is changed. For example, in a case where a user moves from Japan to China, there is a time difference. However, usually, Japan time and China time need only be displayed at the same time by the world clock function on the terminal side, and there is no need to rewrite the time setting of the RTC which is a basis even if the place is changed. In this manner, inside the terminal, the time management of the RTC is performed by the standard time, and the manner in which the time is shown is only changed in each application.

The terminal 6 of this example comprises a position-measurement control section 54 which is capable of measuring the current position in a short time by obtaining the date and time information from this RTC 53 and by comparing the information with the itinerary of the travel data package 10. The terminal 6 further comprises a display control section 55 for controlling the display contents of the portable terminal 6, whereby the display can be changed to a scheduler 56, an itinerary 57, a content display 58, a map display 59, etc. When a date 35 which is displayed in the calendar as shown in FIG. 10(a) is selected, the scheduler 56 displays an itinerary 36 of the day. Also, when the itinerary is changed, by correcting the itinerary 4 of the travel data package 10 by this scheduler 56, position-related information which is referred to by the itinerary to be described below can be changed in such a manner as to be associated with the corrected itinerary. Furthermore, a detailed display button 37 is displayed together with the itinerary, causing a guide (position-related content) of a travel site to be displayed.

In the function 57 for displaying an itinerary, as shown in FIG. 10(b), the itinerary is displayed, and together with this, buttons, such as a hotel button and a detail button 37 for selecting and displaying contents in the travel data package 10 appear.

The content display function 58 is a function for displaying contents contained in the travel data package 10, such as a sightseeing guide, as shown in FIG. 10(c), and together with this, in this example, a map display button 38 and a position obtaining button 39 appear. When the map display button 38 is clicked, the map of the location corresponding to the sightseeing guide is displayed as shown in FIG. 10(d). Then, similarly to FIG. 5(c), the "Where?" button 32 appears. When this button is clicked, the current position is measured by using the GPS unit 51, and is displayed on the map. On the other hand, when the position obtaining button 39 is clicked, a process for measuring the current position is started instantly and is displayed on the map.

Then, in the portable terminal 6 of this example, when there is a request for obtaining the current position, the current-position-measurement control section (current-position-measurement system) 54 starts, and initial information which is determined to be most appropriate is supplied to the GPS computation unit 51b so that the current position can be measured in a short time.

FIG. 7 shows an example of a construction suitable as the portable terminal 6 having such functions. The portable terminal 6 comprises a touch panel 62 as an input means, an LCD 61 as an output means, a CPU 63 which is a control unit, and a ROM 64 and a RAM 65 as memories. These are connected to an internal bus 66, and the GPS unit 51, the PHS unit 52, and the RTC 53 are connected to this internal bus 66. The construction may also be formed in such a way that they are connected to a serial signal of the CPU 63 rather than to the internal bus 66.

Therefore, the portable terminal 6 of this example can realize the functions such as those described above by executing, by the CPU 63, an application program, such as the current-position-measurement system 54 or the scheduler 56, recorded in the ROM 64 or the RAM 65. Also, for this purpose, the travel data package 10 appropriate for the travel is stored in the ROM 64 or the RAM 65. If another recording medium, such as a memory card or a magnetic disk, is provided, these application programs and the data package can be recorded therein. Furthermore, these application programs and the data package can be provided in such a way that they are recorded on an appropriate recording medium, for example, an FD, a CD, and a DVD. Also, programs can be provided by transmitting and receiving a transmission medium in which the software or a data package is embedded via a computer network, such as the Internet, or via a communication means, such as wireless. This is similar to other software described in this example, such as the information provision system 11.

Referring to the flowcharts shown in FIGS. 8 and 9, a description is given of a process by the portable terminal 6 in which the travel data package 10 is stored. Initially, in step 71, when the terminal power is turned on, a display which shows an itinerary shown in FIG. 10(b) or 10(a) is activated. Next, when there is a change in the itinerary, in step 72, the user changes the itinerary of the travel data package 10 by using the function of the scheduler 56. Alternatively, an itinerary change switch may be provided on the screen so that the function of the scheduler 56 is activated by pressing the switch. Also, when the display change is selected in step 73, in step 76, the display by the scheduler 56 and the display by the itinerary display function 57, that is, the displays of FIGS. 10(a) and 10(b), are changed.

When any one of days in the itinerary is selected in step 74, in step 77, a detailed itinerary of that day is displayed. On the terminal display of this example, a cancel process such as that in step 78 is always prepared, so that it is possible to move back to a display of the previous level of hierarchy. When the travel site of the detailed itinerary displayed in step 77 is selected, in step 79, the contents of the travel site are displayed as in FIG. 10(d). Then, in step 80, when the position button 39 is clicked, the current-position-measurement control section 54 starts in step 81. Also, when the map button 38 is clicked in step 82, the map of the selected travel site is displayed in step 83. Even in this state, when the current-position obtaining button 32 is clicked, a process for obtaining the current position starts.

It is well known that for a travel data package, schedule data is updated by using a network. The schedule data may be registered as it is in the scheduler inside the terminal by using vCalender/iCalender, which is an Internet standard data format.

The management of the itinerary 4 is possible only by the function 57 for displaying the itinerary. However, by collectively managing the itinerary 4 by the scheduler 56, ease of operation is improved by placing an itinerary in the scheduler which originally performs schedule management. Also, a program of the scheduler can be shared. Furthermore, there is a merit, such as a detailed schedule being capable of being added on his/her own in addition to an approximate schedule provided by a travel agent.

Sightseeing data (position-related content) 10d is registered in a form such as that shown in FIG. 10(c), and a link may be established from the data item registered on the scheduler screen (FIG. 10(a)). The format shown in FIG. 10(c) is merely an example, and other methods of expression, such as voice data, photograph data, moving-picture data, illustrations, etc., may also be used. When FIG. 10(c) is displayed, a sightseeing guide may also be performed automatically by moving-pictures/voices of course, a content database may be provided so that the data is managed separately. Also, data may be provided inside the scheduler application program. Also, for the auxiliary data (almanac) 10a for position measurement, in a manner similar to the contents, the method of registering the data does not matter as long as it is registered inside the terminal in such a manner as to be associated with the date and time of the itinerary. This is similar to the longitude and latitude data 10b and the map data 10d.

The longitude and latitude data 10b can also be stored in such a manner as to be associated with the map icon 38 of the screen shown in FIG. 10(c). This map icon 38 is further associated with the itinerary and appears on the screen of the scheduler 56 shown in FIG. 10(a). Then, the longitude and latitude information is obtained by tapping the map icon 38, map data containing the longitude and latitude information is searched for, and the position of the longitude and latitude information attached to sightseeing data is displayed in a overlapping manner on the corresponding map. In FIG. 10(c), when the map icon 38 on the sightseeing data of the Merlion is pressed, the position of the Merlion is displayed on the map in FIG. 10(d).

The map data 10c is registered, together with the longitude and latitude information of the four corners, in the travel data package 10 inside the terminal, or in a map data database which is created by developing this data package. The map database stores maps so as to be associated on the basis of the longitude and latitude information of the four corners. When a map is selected by the map icon 38 in FIG. 10(c), a corresponding map is searched/selected on the basis of the longitude and latitude information provided from the map database, and the map is displayed with the longitude and latitude information corresponding to the provided sightseeing data being the center. The map data referred to herein refers to map data in which the sightseeing data is present and the scale is large (in more detail). Of course, thereafter, it is possible that the scale is changed.

It is rare in a trip abroad, etc., that a map is provided in advance inside a terminal. However, in order to have a map display program and a map database in a centralized manner, it is preferable that the map data 10c of the distributed travel data package 10 be registered in a format of a map database so that the map data 10c can be reused.

FIG. 9 shows the outline of processing in the current-position-measurement system 54. When there occurs a need to measure the current position, initially, in step 91, the information of the current date and time is obtained from the RTC 53. Next, in step 92, by referring to the itinerary data 4 or the scheduler 56 having equivalent information, it is determined whether or not the user is on a trip. When the user is not on a trip, it is determined that the user has not moved a significant distance from the previously measured position, and in step 97, a current position 51e measured previously is used as the initial position.

When the user is on a trip at the current date and time, in step 93, an ephemeris 51d is referred to. If this ephemeris 51d is effective, that is, it is up to about three to four hours old, it is determined that the user has not moved a significant distance from the previously measured position, and in a manner similar to that described above, the process proceeds to step 97.

When an effective ephemeris is not stored, then, in step 94, it is confirmed whether or not the travel site location is selected for a display by the scheduler 56. When the position is to be determined from the above-described content display, a travel site which is a display object is always selected. This is because the current-position-measurement system 54 of this example is also used to display the current position on a general-purpose map application. The current-position-measurement system 54 of this example is also used to determine the current by GPS in a system in which the current of the user is always stored in an appropriate server, for example, via a communication means, such as the PHS 52. Then, when the travel site location which is the object of confirmation is not input from the scheduler, etc., in step 96, the longitude and latitude data 10b of the travel site corresponding to the itinerary is selected and is used as the initial position.

On the other hand, when the place (the input place or the current-location area specification for display) of the selected travel site matches the travel site (scheduled place) of the current date and time of the itinerary 4, in step 96, the longitude and latitude data 10b of the travel site location of the current date and time, contained in the travel data package 10, is selected and is used as the initial position.

In step 95, when the current-location area specified place differs from the scheduled place, it is determined that the travel is not progressing according to the itinerary data 4 for some reason, and the initial position is not set in step 98. As a result, since the time in which a GPS satellite is searched for wastefully can be saved when a large distance is moved, it is possible to measure the current position accurately in a shorter time than in a case in which an erroneous current position is made an initial position.

On the other hand, also when the current-location area specification does not match the scheduled place in step 95, instead of the current-location area specified place, the longitude and latitude data 10b of the scheduled place may be selected and used as the initial position in step 96. The reason for this is that, when the current-location area specified place differs from the scheduled place, for example, it is possible to select the travel site location which is scheduled for tomorrow, to determine that the contents thereof are displayed, and to use the longitude and latitude data of the scheduled place as the initial position. Such a selection may be set in advance by the user, or when the current-location area specified position differs from the scheduled place, which one should be selected may be confirmed on the portable terminal each time.

When the initial position for performing GPS position measurement is determined in this manner, in the GPS unit 51, in step 99, a GPS satellite which can be searched for at the initial position is determined from the almanac 10a contained in the travel data package 10, and the radio waves from the satellite are received to measure the current position Therefore, even at a location away from the previously measured location by as much as 150 km, it is possible to capture radio waves from the GPS satellite accurately in a warm start state having appropriate initial information rather than starting position measurement in a state having no information or from erroneous initial information, thus allowing the current position to be measured in a short time at a travel site. The current position thus measured is displayed on the map in step 100.

Of course, in the current-position-measurement system of this example, in step 93, if the user has an effective ephemeris, since a warm start which measures the current position by using the ephemeris is possible, it is possible to obtain the current position in a shorter time according to the situation of the travel site.

In the terminal 6 and the current-position-measurement system 54 of this example, in a case where the current date and time is not registered in the itinerary 4, since domestic use is assumed, a process similar to a normal GPS operation is performed.

Referring to a screen display shown in FIG. 10, the above-described process is described. For example, on the screen shown in FIG. 10(c), when the position button 39 is tapped on the morning of April 6, the current date and time obtained from the RTC 53 is the morning of April 6, and this current-location area specification, that is, the Merlion, matches the location data (Singapore/Merlion on the morning of April 6) of the itinerary 4. That is, within the longitude and latitude information of the four corners of the Singapore area of the location data of the itinerary 4, this current-location area specification, that is, the position of the Merlion, matches. Therefore, the current position is measured by using the position corresponding to the specification of the current-location area, that is, the longitude and latitude data of Singapore, as the initial position.

Next, in a case where the user goes on a trip and confirms a schedule of the next day, for example, when the user is, for example, in Kuala Lumpur, Malaysia on the morning of April 5, on the screen shown in FIG. 10(c), the position button 39 is tapped. Thereupon, the specification of this current-location area does not match the scheduled location data of the itinerary of April 5. That is, within the longitude and latitude information of the four corners of Malaysia of the scheduled location data of the itinerary 4, this current-location area, that is, the position of the Merlion, does not match. Therefore, at this time, the current position, in which the initial position is not provided in the GPS unit 51, is measured. Then, since a position within Malaysia is obtained, as shown in FIG. 10(e), a map containing a current position 33 within Malaysia and the position of the Merlion is displayed.

In the case where there are an almanac and an ephemeris (effective ones), the fact that the distributed almanac is ignored is in a manner as described above. Also, if a mode indicated by a broken line of FIG. 9 is selected, when the position button 39 is tapped on the screen of FIG. 10(c) on April 5, location data within the itinerary, that is, longitude and latitude information corresponding to Kuala Lumpur, Malaysia, is selected and used. Then, on a map having a small (approximate) scale, the current position and the position of sightseeing data (here, the Merlion in Singapore) are displayed so as to overlap with each other.

A brief description is given of an almanac of a GPS system. In the GPS system, a period in which position measurement is possible from when the position measurement starts differs depending on the almanac, the ephemeris, and the time. The almanac which is effective for about one month to three months is position information of satellites, and calculations are possible if a location and a time are known in advance. In the present invention which uses this characteristic, an almanac is adopted, as auxiliary position-measurement information, for a travel data package. The ephemeris, in which prediction is not possible, is updated every hour and is effective for only about four hours. Therefore, conversely, in this example, the effectiveness of the ephemeris is referred to determine whether or not the previously measured current position is effective.

Therefore, in the present invention, an almanac and positional information are added to a travel data package from an itinerary which is known in advance and is sent, and the time is set by a user on the terminal side, thereby making it possible to speed up the time for the position measurement. A comparison is as follows.

Conventionally, for example, in a case where a user goes on a trip carrying a terminal having a GPS function, a state is reached in which there is always no almanac, and at least a period of about three minutes is necessary. In the case of a cold start, since the almanac of that location is updated in about 12.5 minutes, taking all the information takes about 15 minutes when failure of taking information is considered, and in the worst case, a very long time is necessary. Therefore, at the travel site, in most cases, if the position is to be confirmed, about three minutes is necessary.

In contrast, in this example, since the terminal has an almanac, together with positional information data (longitude and latitude data) according to a travel plan, position measurement is possible in about one minute or less at the initial operation. From a second time and later, since the ephemeris is also carried, position measurement is possible in 20 seconds or less.

Therefore, as a result of storing the travel data package 10 of this example, positional information can be obtained readily in a hurried travel, which is a great merit for the user.

Also, since there is date and time information in the almanac data, when a position is to be captured by a GPS system in the terminal, first, it is preferable that the date and time within the almanac inside the terminal be compared with the date and time within the almanac of the travel data package 10 which is distributed from a network and is stored. If the date and time within the almanac inside the terminal is newer, the almanac inside the terminal is used, and if the date and time within the almanac which is distributed from the network is newer, the distributed almanac is used. As a result of making a selection in this manner, a newer almanac can be used, making it possible to improve the capturing speed of GPS.

In the manner as described above, in this example, a travel data package in which position-related information extracted according to an itinerary is packaged in such a manner as to be associated with the itinerary is distributed to each user via a network, so that the user places it in a portable terminal and can refer to the position-related information which is distributed by the travel data package at each location during a travel. In this example, by placing information indispensable for measuring the position by a GPS system in the position-related information of the travel data package, it is possible to develop very convenient and useful services for a user who goes on a trip by carrying a portable terminal in which a GPS system is installed.

More specifically, in this example, by obtaining the location of each city (sightseeing spot) from an itinerary, by forming it into longitude and latitude information, and by containing the information in a travel data package and distributing the travel data package, advantages such as those described below can be obtained. On a travel, in particular, on a trip abroad, the distance traveled is long. Usually, initial position data necessary to speed up the capturing of a GPS satellite is from about 150 km to about 1500 km. In a trip abroad, in most cases, since this degree of distance is traveled, it takes time to capture the GPS satellite unless an initial position is given. If a user in Japan goes on a trip abroad, in a conventional GPS terminal, an attempt is made to capture a satellite by using the location of Japan as the initial value. In this case, it takes more time to determine that a satellite is not found. As GPS terminals, conventionally, there is one terminal in which the initial position is set in such a way that the location is limited to Japan, and there is another terminal in which a previous position is set as the initial position. It is clear that either of them is not appropriate for a travel season. The reason for this is that a previous position does not have a merit although it has a demerit, such as in a case where a user goes abroad by airplane from a country of departure other than Japan.

On the other hand, in a case where longitude and latitude information is stored inside a terminal in such a manner as to correspond to each place, wasteful data is always stored for a travel site which is seldom visited in a lifetime. The case in which data for the whole world is stored causes an increase in the memory capacity for storage and affects the cost, and in turn, the size.

In contrast, in the present invention, since data containing longitude and latitude information necessary at a travel site is extracted according to an itinerary and is packaged, necessary data can be unified in a range which does not impose a load on memory, etc. Therefore, the system and the services of the present invention make it possible to provide a terminal which is capable of measuring the current position in a short time at each location when each place of the world is traveled to by a compact terminal having an appropriate construction although it is not a terminal having an enormous memory capacity. Therefore, this leads to a reduced cost/reduced size of the terminal, an improvement in the capturing speed of GPS, and in turn, an improvement in the user interface.

In the above example, although a description is given by using a trip abroad as an example, a travel site may be any site. Even in the case of a domestic travel, as a result of the information of a place to be visited being packaged and provided, it is possible to accurately obtain the information of the travel site by a portable terminal having an appropriate memory capacity. Also, it is not necessary for all the position-related information necessary for an itinerary to be contained in a travel data package, and, for example, position-related information of a place to be visited the next day can also be downloaded for each day via the Internet.

As has thus been described above, in the present invention, a system for supplying a travel data package in which position-related information of a travel site is packaged on the basis of itinerary information, and a system suitable for measuring the current position in a short time by using that travel data package, in particular, a travel data package containing information effective for measuring the current position, are provided. Therefore, by using these systems, it is possible for a user to always obtain information regarding a travel site location by a portable terminal in a short time at a travel site. In particular, since the current position can be obtained in a short time, the time during a travel can be utilized more effectively. Therefore, a sightseeing travel can be made more comfortable and enjoyable, and a business trip can be made more efficient and effective.

What is claimed is:

1. An information provision system comprising:
   means for obtaining itinerary information in which at least one place, a date and time are associated;
   means for extracting position-related information which is related to the place contained in the itinerary information, the position related information including a content of the place;
   means for creating a travel data package by associating said extracted position-related information with the date and time contained in said itinerary information; and
   means for distributing said travel data package which distributes said travel data package via a computer network.

2. An information provision system according to claim 1, wherein said position-related information further contains one piece of auxiliary position-measurement information used when the current position is measured, at least one piece of longitude and latitude information corresponding to the place of said itinerary information, or map data containing said place.

3. An information provision system according to claim 2, wherein said auxiliary position-measurement information is an almanac used when the current position is measured by receiving radio waves from a satellite.

4. An information provision system according to claim 1, wherein the content of the place includes at least one photograph relating to the place.

5. An information provision method comprising:
   a step of obtaining itinerary information in which at least one place, a date and time are associated;
   a step of extracting position-related information related to the place contained in the itinerary information, the position related information including a content of the place, and of creating a travel data package in which the position-related information is associated with the date and time contained in said itinerary information; and
   a step of distributing said travel data package via a computer network.

6. An information provision method according to claim 5, wherein said position-related information further contains one piece of auxiliary position-measurement information used when the current position is measured, at least one piece of longitude and latitude information corresponding to the place of said itinerary information, or map data containing said place.

7. An information provision method according to claim 6, wherein said auxiliary position-measurement information is an almanac used when the current position is measured by receiving radio waves from a satellite.

8. An information provision system according to claim 5, wherein the content of the place includes at least one photograph relating to the place.

9. A computer-readable recording medium having recorded thereon an information provision program having commands capable of executing:
   a step of obtaining itinerary information in which at least one place, a date and time are associated;

a step of extracting position-related information related to the place contained in the itinerary information and of creating a travel data package in which the position-related information is associated with the date and time contained in said itinerary information, the position-related information including a content of the place; and a step of distributing said travel data package via a computer network.

10. A computer-readable recording medium having recorded thereon said information provision program according to claim 9, wherein said position-related information further contains one piece of auxiliary position-measurement information used when the current position is measured, at least one piece of longitude and latitude information corresponding to the place of said itinerary information, or map data containing said place.

11. A computer-readable recording medium having recorded thereon said information provision program according to claim 10, wherein said auxiliary position-measurement information is an almanac used when the current position is measured by receiving radio waves from a satellite.

12. A transmission medium, which can be transmitted via a computer network, having embedded thereon an information provision program having commands capable of executing:

a step of obtaining itinerary information in which at least one place, a date and time are associated;

a step of extracting postion-related information related to the place contained in the itinerary information and of creating a travel data package in which the position-related information is associated with the date and time contained in said itinerary information, the position-related information including a content of the place; and a step of distributing said travel data package via the computer network.

13. A transmission medium which can be transmitted via a computer network, wherein a travel data package is embedded in the transmission medium and in which postion-related information related to a place contained in itinerary information in which the position-related information includes a content of the place and in which at least one place, a date and time are associated is stored so as to be associated with the date and time contained in said itinerary information.

14. A transmission medium which can be transmitted via a computer network according to claim 13, wherein said travel data package is embedded in which said position-related information further contains some auxiliary position-measurement information used when the current position is measured, at least one piece of longitude and latitude information corresponding to the place of said itinerary information, or map data containing said place.

* * * * *